United States Patent
Liou et al.

(10) Patent No.: US 7,210,662 B2
(45) Date of Patent: May 1, 2007

(54) DISPLAY DEVICE WITH A FOLDABLE SUSPENSION ARM

(75) Inventors: Guan-De Liou, Taipei (TW); Lo-I Cheng, Taichung Hsien (TW)

(73) Assignee: Hannspree, Inc., Taipei (TW)

( * ) Notice: Subject to any disclaimer, the term of this patent is extended or adjusted under 35 U.S.C. 154(b) by 86 days.

(21) Appl. No.: 11/028,178

(22) Filed: Dec. 30, 2004

(65) Prior Publication Data

US 2006/0145043 A1 Jul. 6, 2006

(51) Int. Cl.
*E04G 3/00* (2006.01)

(52) U.S. Cl. .............................. 248/282.1; 248/205.5; 248/206.2; 248/298.1

(58) Field of Classification Search ............ 248/276.1, 248/282.1, 286.1, 288.31, 917, 919, 920, 248/922, 205.5, 683, 363, 442.2, 206.2, 298.1; 361/681, 683; 349/58; 381/311; 40/597
See application file for complete search history.

(56) References Cited

U.S. PATENT DOCUMENTS

| | | | | |
|---|---|---|---|---|
| 1,382,783 A * | 6/1921 | Howard | .................... | 248/276.1 |
| 2,439,009 A * | 4/1948 | Kujawski | ..................... | 403/56 |
| 2,557,434 A * | 6/1951 | Hoverder | .................... | 248/544 |
| 2,875,973 A * | 3/1959 | Hull | ........................ | 248/205.5 |
| 3,986,692 A * | 10/1976 | Kinoshita | .................... | 248/160 |
| 4,767,231 A * | 8/1988 | Wallis | .......................... | 403/56 |
| 5,568,357 A * | 10/1996 | Kochis et al. | .............. | 361/681 |
| 6,178,085 B1 * | 1/2001 | Leung | ......................... | 361/683 |
| 6,348,259 B1 * | 2/2002 | Hilarius et al. | ............. | 428/323 |
| 6,379,073 B1 * | 4/2002 | Yoo et al. | ..................... | 403/90 |
| 6,484,994 B2 * | 11/2002 | Hokugoh | .................... | 248/371 |
| 6,491,273 B2 * | 12/2002 | King et al. | ............. | 248/276.1 |
| 6,554,238 B1 * | 4/2003 | Hibberd | ................... | 248/278.1 |
| 6,570,627 B1 * | 5/2003 | Chang | ......................... | 348/794 |
| 6,637,104 B1 * | 10/2003 | Masuda et al. | ............... | 29/832 |
| 6,885,314 B2 * | 4/2005 | Levin et al. | ..................... | 341/20 |
| 2003/0231460 A1 * | 12/2003 | Moscovitch | ................ | 361/681 |
| 2004/0233623 A1 * | 11/2004 | Hillman et al. | ............. | 361/683 |

* cited by examiner

*Primary Examiner*—Carl D. Friedman
*Assistant Examiner*—Michael McDuffie
(74) *Attorney, Agent, or Firm*—Ladas & Parry LLP

(57) ABSTRACT

A display device includes a display panel having a front surface for display, a rear surface, and two opposite lateral sides. A supporting unit includes a mounting seat adapted to be mounted fixedly on a supporting surface, and a foldable suspension arm having a first end connected pivotally to the mounting seat, and a second end opposite to the first end and attached to the rear surface of the display panel. The suspension arm includes a plurality of suspension arm sections, each of which is connected pivotally to an adjacent one of the suspension arm sections such that the second end of the suspension arm is movable relative to the first end of the suspension arm.

6 Claims, 3 Drawing Sheets

DISPLAY DEVICE WITH A FOLDABLE SUSPENSION ARM

BACKGROUND OF THE INVENTION

1. Field of the Invention

The invention relates to a display device, more particularly to a display device with a foldable suspension arm.

2. Description of the Related Art

A conventional liquid crystal display device can be disposed stably on a table by the use of a supporting seat or can be hung on a wall. As such, the conventional liquid crystal display device is disposed at a fixed location, and therefore is not suitable for a viewer who may move within a relatively large area.

SUMMARY OF THE INVENTION

Therefore, the object of the present invention is to provide a display device with a foldable suspension arm that can be adjusted so as to position the display device as desired.

According to the present invention, there is provided a display device adapted to be fixed on a supporting surface. The display device comprises:

a display panel having a front surface for display, a rear surface, and two opposite lateral sides; and a supporting unit including a mounting seat adapted to be mounted fixedly on the supporting surface, and a foldable suspension arm having a first end connected pivotally to the mounting seat, and a second end opposite to the first end and attached to the rear surface of the display panel, the suspension arm including a plurality of suspension arm sections, each of which is connected pivotally to an adjacent one of the suspension arm sections such that the second end of the suspension arm is movable relative to the first end of the suspension arm.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
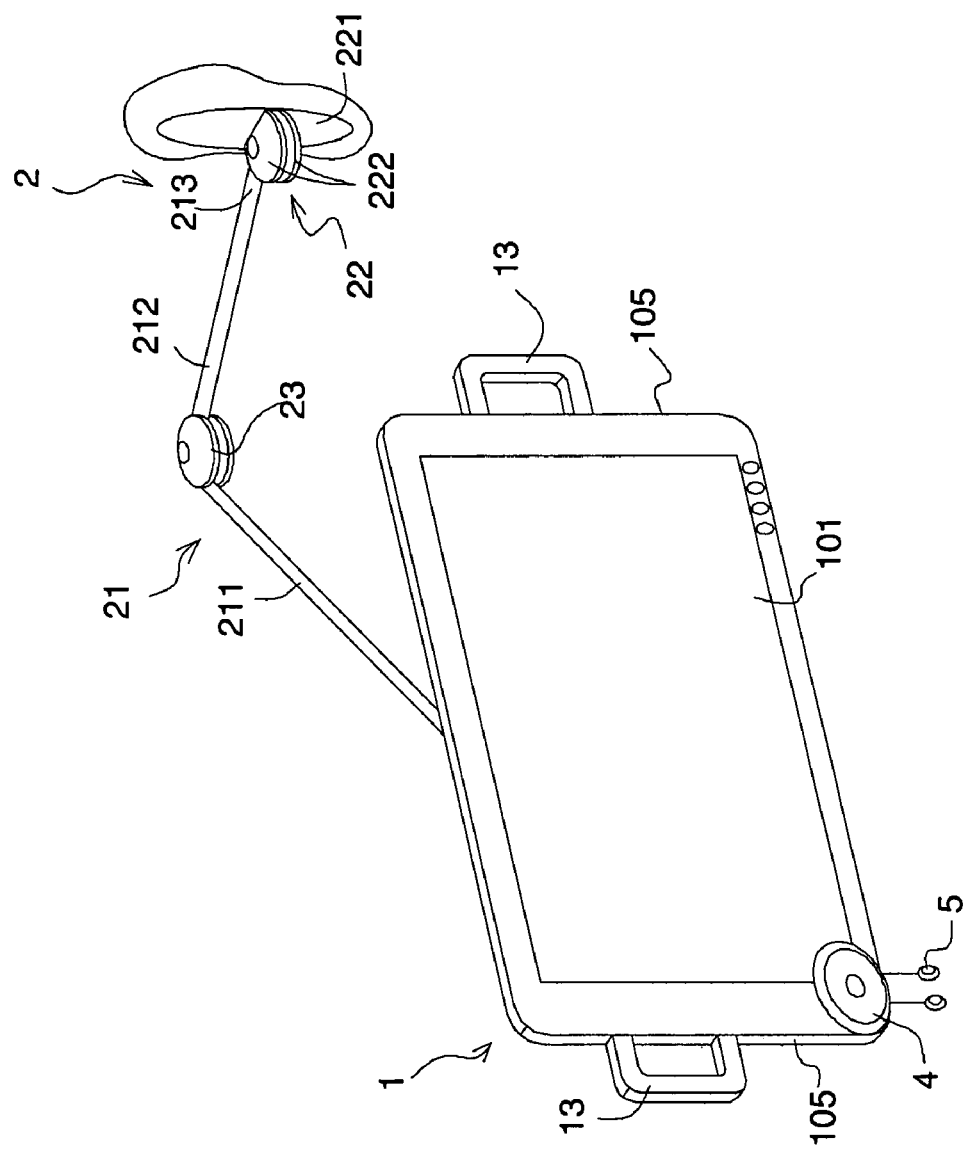
FIG. 1 is a perspective view showing the preferred embodiment of a display device according to the present invention.
Figure 2:
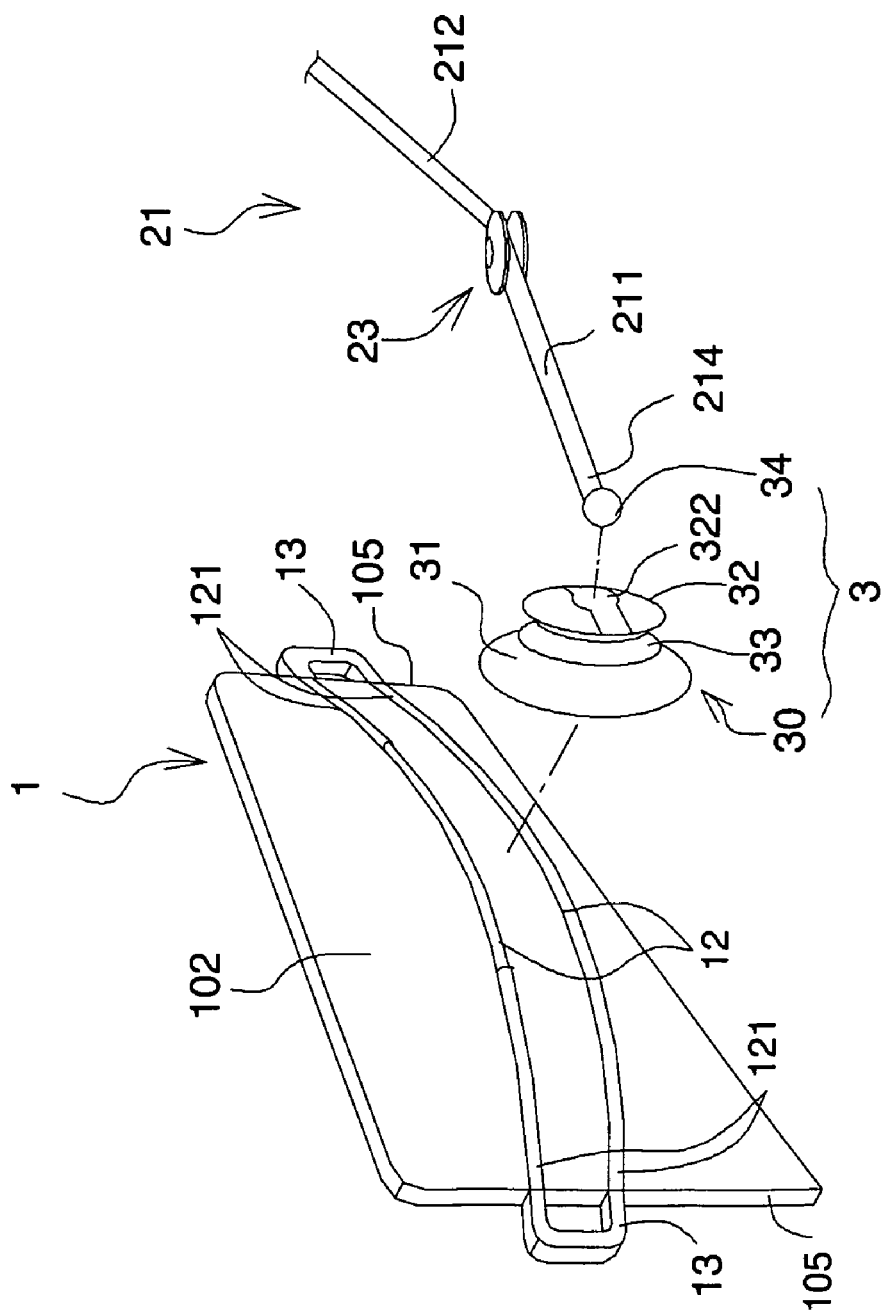
FIG. 2 is a partly exploded, fragmentary perspective rear view showing the preferred embodiment.
Figure 3:
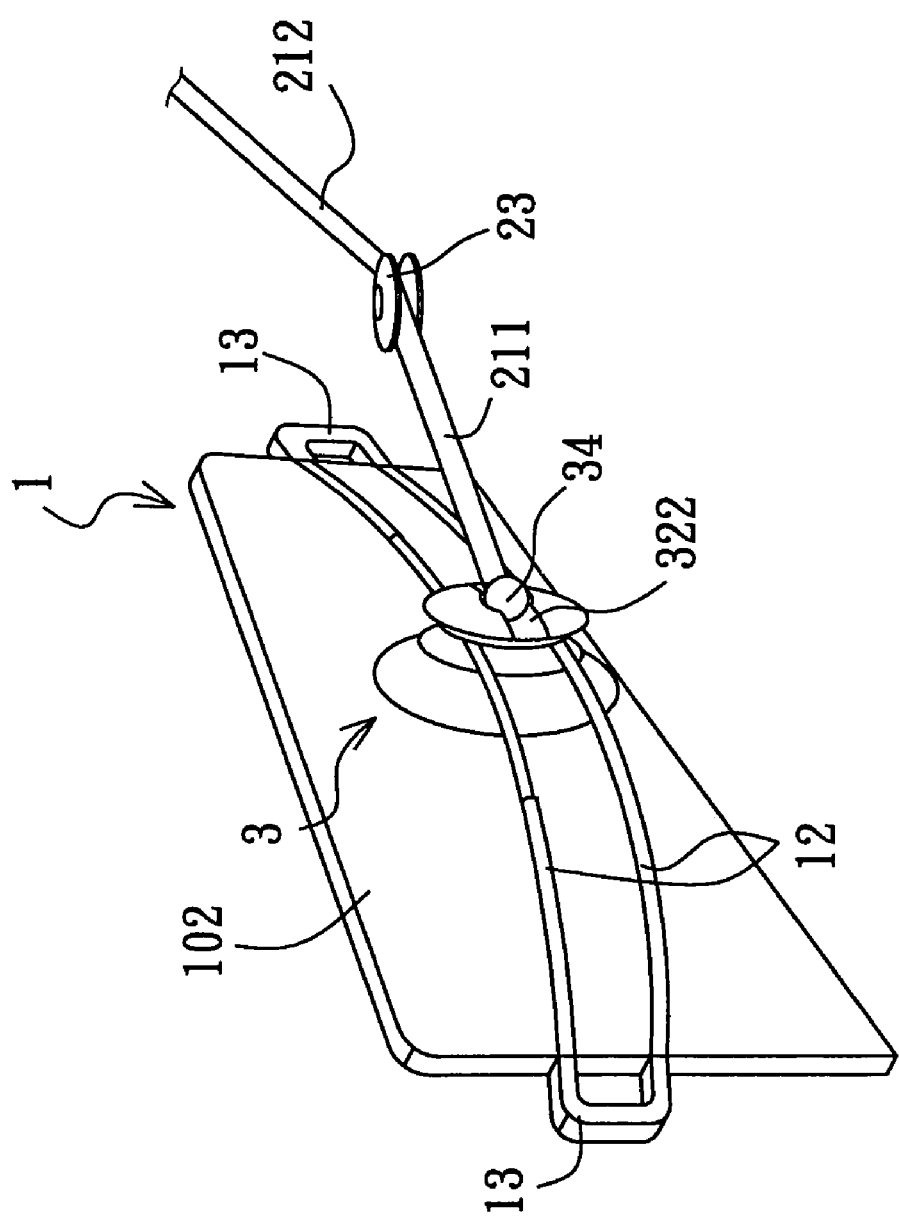
FIG. 3 is a fragmentary perspective rear view showing the preferred embodiment.

Referring to FIGS. 1 and 2, the preferred embodiment of a display device adapted to be fixed on a supporting surface (not shown), such as a wall surface and a table surface, according to the present invention is shown to include a display panel 1, a supporting unit 2, and a universal joint 3.

The display panel 1 has a front surface 101 for display, a rear surface 102, and two opposite lateral sides 105. In this embodiment, the display panel 1 includes a pair of clamping strips 12, which are made of metal, plastic, rubber or wood. Each clamping strip 12 has two opposite ends 121 that are fastened respectively to the lateral sides 105 of the display panel 1, as shown in FIG. 2. In this embodiment, the front surface 101 of the display panel 1 is formed with an accommodating chamber 4 adapted for accommodating an earphone 5, as shown in FIG. 1. Furthermore, each lateral side 105 of the display panel 1 is formed with a handgrip 13.

The supporting unit 2 includes a mounting seat 22 adapted to be mounted fixedly on the supporting surface, and a foldable suspension arm 21 having a first end 213 connected pivotally to the mounting seat 22, and a second end 214 opposite to the first end 213 and attached to the rear surface 102 of the display panel 1. In this embodiment, the mounting seat 22 includes a base plate 221 adapted to be fixed on the supporting surface, and two aligned pivot lugs 222 connected fixedly to and transverse to the base plate 221. The first end 213 of the suspension arm 21 is connected pivotally between the pivot lugs 222. In this embodiment, the suspension arm 21 includes first and second suspension arm sections 212, 211 that are connected pivotally to each other by means of a pivot seat 23. The first suspension arm section 212 has the first end 213, and the second suspension arm section 211 has the second end 214. As such, the second end 214 of the suspension arm 21 is movable relative to the first end 213 of the suspension arm 21.

The universal joint 3 includes a supporting seat 30 mounted fixedly on the rear surface 102 of the display panel 1 and having a ball groove 322, and a ball body 34 fixed to the second end 214 of the suspension arm 21 and received fittingly and rotatably within the ball groove 322 in the supporting seat 30. In this embodiment, the supporting seat 30 is designed as a suction cup, and includes a cup portion 31 attached to the rear surface 102 of the display panel 1 using a suction force, a head portion 32 formed with the ball groove 322, and a neck portion 33 disposed between the cup portion 31 and the head portion 32. It is noted that the neck portion 33 is clamped between the clamping strips 12 of the display panel 1 so as to retain the display panel 1 on the suspension arm 21 even when the cup portion 31 of the supporting seat 30 is removed from the rear surface 102 of the display panel 1.

Due to the presence of the foldable suspension arm 21 and the universal joint 3, the display device of this invention can be easily adjusted so as to position the display panel 1 at a desired position within a relatively large area.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A display device adapted to be fixed on a supporting surface, said display device comprising:

a display panel having a front surface for display, a rear surface, and two opposite lateral sides;

a supporting unit including a mounting seat adapted to be mounted fixedly on the supporting surface, and a foldable suspension arm having a first end connected pivotally to said mounting seat, and a second end opposite to said first end and attached to said rear surface of said display panel, said suspension arm including a plurality of suspension arm sections, each of which is connected pivotally to an adjacent one of said suspension arm sections such that said second end of said suspension arm is movable relative to said first end of said suspension arm; and a universal joint that includes a supporting seat mounted fixedly on said rear surface of said display panel and having a ball groove, and a ball body fixed to said second end of said suspension arm and received fittingly and rotatably within said ball groove in said supporting seat;

wherein said supporting seat is designed as a suction cup, and includes a cup portion attached to said rear surface of said display panel using a suction force, a head portion, and a neck portion disposed between said cup portion and said head portion, said ball groove being formed in said head portion, said display panel including a pair of clamping strips, each of which has two opposite ends that are fastened respectively to said lateral sides of said display panel, said neck portion being clamped between said clamping strips so as to retain said display panel on said suspension arm even when said cup portion is removed from said rear surface of said display panel.

2. The display device as claimed in claim 1, wherein said mounting seat of said supporting unit includes a base plate adapted to be fixed on the supporting surface, and two aligned pivot lugs connected fixedly to and transverse to said base plate, said first end of said suspension arm being connected pivotally between said pivot lugs.

3. A display device adapted to be fixed on a supporting surface, said display device comprising:

a display panel having a front surface for display, a rear surface, and two opposite lateral sides; and a supporting unit including a mounting seat adapted to be mounted fixedly on the supporting surface, and a foldable suspension arm having a first end connected pivotally to said mounting seat, and a second end opposite to said first end and attached to said rear surface of said display panel, said suspension arm including a plurality of suspension arm sections, each of which is connected pivotally to an adjacent one of said suspension arm sections such that said second end of said suspension arm is movable relative to said first end of said suspension arm;

wherein said front surface of said display panel is formed with an accommodating chamber adapted for accommodating an earphone.

4. A display device adapted to be fixed on a supporting surface, said display device comprising:

a display panel having a front surface for display, a rear surface, and two opposite lateral sides; and a supporting unit including a mounting seat adapted to be mounted fixedly on the supporting surface, and a foldable suspension arm having a first end connected pivotally to said mounting seat, and a second end opposite to said first end and attached to said rear surface of said display panel, said suspension arm including a plurality of suspension arm sections, each of which is connected pivotally to an adjacent one of said suspension arm sections such that said second end of said suspension arm is movable relative to said first end of said suspension arm;

wherein at least one of said lateral sides of said display panel is formed with a handgrip, said handgrip being configured as a ring and being disposed at a middle portion of said one of said lateral sides of said display panel.

5. The display device as claimed in claim 3, comprising a universal joint that includes a supporting seat mounted fixedly on said rear surface of said display panel and having a ball groove, and a ball body fixed to said second end of said suspension arm and received fittingly and rotatably within said ball groove in said supporting seat.

6. The display device as claimed in claim 4, comprising a universal joint that includes a supporting seat mounted fixedly on said rear surface of said display panel and having a ball groove, and a ball body fixed to said second end of said suspension arm and received fittingly and rotatably within said ball groove in said supporting seat.

* * * * *